United States Patent Office 3,546,289
Patented Dec. 8, 1970

3,546,289
PROCESS FOR PREPARATION OF ACRYLAMIDE
Oliver A. Kiikka, Willoughby, Ohio, assignor to The Standard Oil Company, Cleveland, Ohio, a corporation of Ohio
No Drawing. Filed July 26, 1967, Ser. No. 656,054
Int. Cl. C07c 103/08
U.S. Cl. 260—561                                        3 Claims

ABSTRACT OF THE DISCLOSURE

The process for preparing acrylamide, as described herein, includes the following steps:
(1) Treating acrylonitrile with sulfuric acid and water in the presence or absence of a polymerization inhibitor,
(2) Neutralizing the reaction mixture in the presence of an aprotic solvent,
(3) Removing the aprotic solvent from solid reaction products,
(4) Dissolving soluble solid reaction products in a hydrocarbon solvent, such as acetone,
(5) Separating the hydrocarbon solvent from nonsoluble products, and
(6) Evaporating or distilling the hydrocarbon solvent to obtain solid acrylamide.

For the most part, above process is conventional. The novel feature of the process is in the neutralizing step which is effected in presence of an aprotic solvent, defined as a straight-chain or branch-chain hydrocarbon or its halogen derivative, which is neither a proton acceptor nor a proton donor.

---

This invention relates to the process for preparation of acrylamide from acrylonitrile. This is accomplished by sulfuric acid hydrolysis of acrylonitrile to form acrylamide sulfate, neutralization in the presence of an aprotic solvent of the acrylamide sulfate to form acrylamide, and separation of acrylamide. The novel feature of the process resides in the step of neutralization which is accomplished in the presence of an aprotic solvent.

Acrylamide and its polymerization and copolymerization products have become of increasing importance, particularly in the fields of adhesives, dispersants, fibers, plasticizers, surface coatings, thickening agents, as well as in the leather, paper, rubber, textile and photographic arts. Because of these many potential applications, there has been a decided increased interest in improved processes for producing monomeric acrylamide.

Acrylonitrile is particularly suitable as the starting material because of its low cost and ready conversion to acrylamide sulfate by the use of sulfuric acid and water. The hydration is conveniently carried out by adding acrylonitrile slowly to the acid. The reaction is strongly exothermic and is complete in about an hour at 90–100° C. or 5–8 minutes at 155–175° C. It is usually necessary to use a polymerization inhibitor which is not affected by the strongly acid conditions prevailing. Copper, iron, or sulfur compounds are known polymerization inhibitors, with copper and iron salts being particularly useful for this purpose.

Although the preparation of acrylamide sulfate offers no great difficulties, isolation of pure acrylamide is complex. The bulk of prior art is directed to the problem of isolation of pure acrylamide.

In British Patent 631,592, the primary steps of the process for preparation of acrylamide are treating acrylonitrile with sulfuric acid and water, neutralizing the resulting reaction mixture, and recovering acrylamide therefrom.

The first step of the process is carried out either by treating the nitrile with dilute sulfuric acid, or treating the nitrile with concentrated sulfuric acid followed by addition of water. The reaction mixture in either procedure is preferably maintained at a temperature within the range of from 120–150° C.

Alkaline materials which may be employed in the neutralizing step include ammonia, ammonium carbonate, alkali metal and alkaline earth metal hydroxides and carbonates.

After neutralization, recovery of acrylamide is effected by solvent extraction, using such solvents as acetone, ether, or a low molecular weight alcohol such as methanol or isopropanol. The sulfate precipitate is separated by filtration, and acrylamide is recovered by evaporation of the solvent.

In U.S. Patent 3,301,900, hydrolysis and neutralization are effected in the presence of a solvent, such as benzene or toluene, which is immiscible with water and which does not dissolve acrylamide at ordinray temperatures but which dissolves acrylamide when hot. More specifically, the reaction mixture containing the solvent is heated during or after neutralization to a temperature sufficient to effect an extraction of acrylamide from the mixture by the solvent. Since the solvent is immiscible with water, the solvent phase is easily separated, following which the solvent phase is cooled to precipitate pure acrylamide.

The most remarkable fact about the above process, as alleged by the patentee, is that utilization of the particular solvents makes it possible to eliminate the distillations which are necessary in the known processes.

The process described herein generally consists of the following steps:
(1) Treating acrylonitrile with sulfuric acid and water in the presence or absence of a polymerization inhibitor,
(2) Neutralizing the reaction mixture in the presence of an aprotic solvent,
(3) Removing the aprotic solvent from solid reaction products,
(4) Dissolving soluble solid reaction products in a solvent,
(5) Separating the solvent from non-soluble products,
(6) Evaporating or distilling the solvent to obtain solid acrylamide.

The ratio of acrylonitrile/acid/water used in the hydrolysis step is preferably on a 1/1/1 mol ratio. After sulfuric acid is added to water and the mixture is cooled, polymerization inhibitor is added, although the reaction can be carried out without the use of a polymerization inhibitor. The inhibitor should be fresh. Next, acrylonitrile is added slowly with stirring. When addition of acrylonitrile is complete, the mixture is heated to a temperature which may be as high as 250° C., to complete the reaction, which may take about 45 minutes or less. The mixture is then cooled to about 60° C., or 70° C. or lower, and the still molten acrylamide sulfate is added with stirring to an aprotic solvent containing dispersed solid particles of an alkaline material, such as calcium hydroxide. It is preferable to deaerate the solid in the slurry, i.e., calcium hydroxide in the aprotic solvent, prior to the addition of molten acrylamide sulfate.

Aprotic solvent is defined as a solvent which is neither a proton acceptor nor a proton donor. This solvent is a straight-chain or a branch-chain hydrocarbon or its halogen derivative boiling preferably in the range of about 20–190° C., such as n-pentane, isopentane, n-hexane, isohexane, carbon tetrachloride, chloroform, n-heptane, 67–105° C. boiling range fraction from motor alkylate produced by alkylating butylenes with isobutane, etc. Aprotic solvents boiling below 20° C. can also be used, although, as in the case of butane which boils at −0.55° C., the system must be maintained under pressure. Temperatures in excess of about 60° C. will degrade acrylamide. For this reason, removal of an aprotic solvent is accomplished under vacuum and at a temperature which is innocuous to acrylamide. The upper limit on the boiling point of aprotic solvents has been set at 190° C. since it is believed that it would be extremely difficult or impractical to remove higher boiling aprotic solvents. The vacuum which would have to be applied to remove an aprotic solvent boiling above 190° C. would be extremely low.

Amounts of the aprotic solvent per 100 grams of acrylamide sulfate has been varied between 400 and 600 grams and found to be operable. The amount of aprotic solvent used depends on its specific heat, since the solvent is necessary to regulate the temperature during the neutralization of acrylamide sulfate. It is not intended to limit the process to any specific amount of the aprotic solvent since one skilled in the art would be able to make this determination with a minimum amount of experimentation.

Since sulfuric acid usually degrades hydrocarbon solvents, the aprotic solvent is added after formation of acrylamide sulfate is essentially complete. The solvent does not enter into any reactions, as far as is known, but functions as a heat sink and a dispersing agent. Its presence in the neutralization step also prevents discoloration of acrylamide, which is probably due to high temperatures.

Since the aprotic solvent is at a much lower temperature than the molten acrylamide sulfate, the acrylamide sulfate flocculates upon coming into contact with the aprotic solvent. At this point, the solution consists essentially of solid particles of an alkaline material, calcium hydroxide in this case, solid particles of acrylamide sulfate, and an inert dispersant, i.e., the aprotic solvent. The neutralization of acrylamide sulfate occurs between solid particles of acrylamide sulfate and calcium hydroxide in a completely anhydrous environment. The solids, having been deaerated, come into intimate contact with each other and give a reasonably quick reaction in about 35 to 45 minutes. The slurry is generally at a temperature of about up to 40° C. at the start of the neutralization, and should be kept below about 60° C. during neutralization. Since the neutralization reaction is exothermic, excess heat must be removed by an external cooling means.

When the neutralization reaction is complete, the aprotic solvent is removed, as by filtration, and acrylamide is extracted by means of a solvent such as acetone, ether, or a low molecular weight alcohol such as methanol or isopropanol. Acetone is the preferred solvent. Acrylamide is obtained by evaporation of the solvent. Further purification of the acrylamide can be accomplished by methods well known in the art.

Although preparation of only acrylamide has been described, it should be understood that related compounds to acrylamide, such as methacrylamide, can also be prepared by the herein described process using methacrylonitriles as one of the starting reactants.

EXAMPLE I 195 grams of 59–98 percent sulfuric acid were added to 30 grams of water in a one-liter, four-neck flask and allowed to cool to room temperature. The flask was disposed on a heating mantle connected to a Variac and was equipped with a thermometer, a reflux condenser, a calibrated dropping tube, and a stirrer. 0.1 gram of ferrous sulfate, $FeSO_4 \cdot 7H_2O$, was added as a polymerization inhibitor. 100 grams of freshly distilled acrylonitrile were added with stirring to the reaction vessel through the calibrated dropping tube. The time of addition of the acrylonitrile was about five minutes. The following data relates to preparation of acrylamide after addition of acrylonitrile was completed:

| Time | Temperature (° C.) | Notes |
|---|---|---|
| 9:44 (start) | 41.5 | Variac set at 40. |
| 9:47 | 44 | |
| 9:52 | 54 | |
| 9:55 | 63 | |
| 9:58 | 79 | |
| 9:58+15 seconds | 81 | |
| 9:58+15 seconds | 85 | Dropped heating mantle. |
| 9:58+15 seconds | 88 | |
| 9:59 | 91 | Started refluxing in external condenser. |
| 9:59+15 seconds | 96 | |
| 9:59+15 seconds | 98 | |
| 9:59+15 seconds | 100 | |
| 10:00 | 101 | |
| 10:01 | 105 | |
| 10:02 | 109 | |
| 10:03 | 114 | |
| 10:04 | 117 | |
| 10:05 | 122 | External condenser no longer refluxing. Still refluxing on sides of the flask. |
| 10:05+30 seconds | 125 | Applied cool wet cloth to the flask bottom for a few seconds. |
| 10:07 | 122 | |
| 10:10 | 120 | |
| 10:13 | 113 | |
| 10:20 | 97 | |
| 10:25 | 85 | |
| 10:30 | 73.5 | |

The neutralization of acrylamide was made in twice-acid washed and then water washed n-heptane. The purpose of the acid washing was to remove olefins which alkylate with acrylamide and contaminate the product.

500 grams of acid washed n-heptane were mixed with 100 grams of calcium hydroxide in a flask. This produced a uniformly dispersed mixture of calcium hydroxide in n-heptane. 74.22 grams of acrylamide sulfate were then slowly added with vigorous stirring. During the neutralization, the temperature rose to 55° C.

Following neutralization of acrylamide sulfate, n-heptane was removed from solids by filtration. The solids were dried by application of vacuum and acetone was then added to the solids and the solution was stirred for ten minutes to dissolve acrylamide. To separate acrylamide from calcium sulfate, unreacted calcium hydroxide, ferrous sulfate inhibitor, etc., acetone solution was filtered and acetone and any remaining n-heptane distilled under vacuum leaving solid acrylamide.

Solid acrylamide looked a little wet, so benzene was added to azeotrope-distill any water. The yield of the final product was 28.73 grams which amounted to a recovery of 94 weight percent of the theoretical. The product assayed 96.2 percent purity.

EXAMPLE II

The ratio of acrylonitrile/acid/water used in the hydrolysis step was 1/1/1 mol ratio.

To 33.95 grams of tap water in a stirred-type reactor with external reflux condenser and internal cooling coils were added 184.85 grams of sulfuric acid, on 100 percent basis. The mixture was cooled to 40° C. and 0.1 gram of copperas, $FeSO_4 \cdot 7H_2O$, was added. A key point here is to use fresh inhibitor since prolonged contact with the air will destroy effectiveness of the inhibitor and lead to run-away reactions.

100 grams of acrylonitrile were added slowly, in less than five minutes, with stirring. The reaction mixture was heated to 95° C. and then held below 120° C. using the cooling coils. The reaction was complete in less than twenty minutes.

The contents of the reaction were then cooled to 60–70° C. and 318.9 grams of molten acrylamide sulfate were pumped to a neutralizer tank.

To neutralize acrylamide sulfate, 159.20 grams of calcium hydroxide in 1500 grams of n-hexane were used. Since the heat of neutralization causes acrylamide sulfate to melt, acrylamide sulfate functioned as a binder and fused the solids into prill-like agglomerates. For this reason, 380 grams of gypsum, $CaSO_4 \cdot 2H_2O$, from previous neutralization were recycled. This corresponds to 14 percent of excess alkali.

A key step in neutralization is deaeration of the solids in the slurry prior to the addition of molten acrylamide sulfate. The molten acrylamide sulfate is added while stirring. It disperses as small solid particles in the aprotic solvent and is encapsulated by the calcium hydroxide-gypsum slurry. The neutralization step occurs between two solids in a completely anhydrous environment. The solids, being deaerated, come into intimate contact and give a reasonably quick reaction time, i.e., about 35 to 45 minutes. The slurry should be at about 40° C. at the start of neutralization and kept below 60° C. during neutralization. The solids, i.e., calcium hydroxide and gypsum, having been completely wetted by the aprotic solvent, do not absorb the water of neutralization. In other words, the solids taking part in the neutralization step are completely water-proofed. This is critical to recovering high yields of acrylamide product during the leaching step. Solvent leaching of the solids and their removal of the solvent yields a water solution containing about 66 percent by weight acrylamide. This corresponds to two mols of water, formed during the neutralization, to one mol of acrylamide product.

The product formed during the neutralization step had some prills in it and it was convenient to chop them up in the solvent before removing the solvent and the leaching operation. The Waring Blendor for 10–15 seconds has worked fine. The solvent was then easily removed from the solids by an aspiration system using a porous stainless steel insert in the drain.

n-Hexane was removed from the solids by filtration and the solids, i.e., essentially acrylamide, were dissolved in acetone.

Acetone works best during the leaching operation and is to be preferred to methanol. Although both solvents react in the presence of a slight excess of calcium hydroxide, methanol appears to add to the acrylamide double bond, while acetone produces, upon prolonged contact, diacetone alcohol. Diacetone alcohol is an impurity of negligible quantity, less than one percent in the crystalline acrylamide product, and simple means are available for its removal.

Since aprotic solvents and acetone are miscible, the solvent power of acetone was reduced in the first leaching stage. n-Hexane absorbed on the solids is displaced by acetone. Acetone is reported to dissolve 63.1 grams of acrylamide at 30° C. per 100 grams of solvent. A 50/50 mixture of acetone with n-hexane will dissolve essentially no acrylamide at room temperature. Laboratory experiments indicate that at least two stages are necessary.

The liquor from the leaching operation was vacuum distilled at 25° C. to recover the acetone containing most of the n-hexane that was on the solids from the neutralization step. The solution remained clear until the point at which the vacuum dropped to about 25 mm. at 25° C. The acrylamide-water solution became saturated and crystals of acrylamide appeared on the surface. The solution which remained, contained 66 percent acrylamide. The acrylamide solution can easily be converted to the crystalline product by further vacuum distillation, benzene azeotrope of the water, or by other conventional means.

It was found that by following the procedure outlined above, no inhibitor is required during the neutralization, leaching, or solvent removal steps.

The solids after the leaching operation contained about 30 weight percent acetone. Steam stripping of the solids recovered acetone and converted anhydrous calcium sulfate to its gypsum form for recycle.

Crystalline acrylamide product was obtained at 97.6 weight percent of the theoretical amount based on acrylonitrile consumed. The purity of the product was 95.7 percent with overall yield of 93.4 percent. With minor modification, the purity can be increased to 98+ percent.

I claim:
1. In a process for the preparation of acrylamide comprising reacting acrylonitrile with a stoichiometric amount of sulfuric acid at a concentration corresponding to its monohydrate, in the presence of a polymerization inhibitor, to form acrylamide sulfate, neutralizing said acrylamide sulfate in a liquid medium with a suitable base to form acrylamide and the acid salt insoluble in said liquid medium, and recovering said acrylamide, the improvement consisting of reacting acrylamide sulfate with a suspension of a solid alkali metal or alkaline earth metal hydroxide in a liquid medium consisting essentially of paraffins having from 1 to 10 carbon atoms or halogen substituted derivatives thereof, at a temperature lower than 60° C., to form an intimate solid mixture of acrylamide and the acid salt of said alkali metal or alkaline earth metal, and separating said solid mixture from said liquid medium.

2. The process of claim 1 wherein said intimate solid mixture, substantially free from said liquid medium, is contacted with a solvent in which acrylamide is preferentially soluble and recovering substantially pure acrylamide from said solvent.

3. In a process for the preparation of acrylamide comprising reacting acrylonitrile with a stoichiometric amount of sulfuric acid at a concentration corresponding to its monohydrate in the presence of a polymerization inhibitor to form molten acrylamide sulfate, neutralizing said acrylamide sulfate with solid calcium hydroxide in a liquid medium in which calcium sulfate is insoluble, and recovering acrylamide from the mixture of reaction products, the improvement consisting of adding said acrylamide sulfate to a liquid medium selected from the group consisting of paraffins having from 1 to 10 carbon atoms and halogen derivatives thereof, in which liquid medium is suspended said solid calcium hydroxide, to form an intimate solid mixture of acrylamide and calcium sulfate, separating said solid mixture from said liquid medium, extracting acrylamide from said solid mixture, substantially free of said liquid medium, with a solvent in which acrylamide is preferentially soluble, and recovering substantially pure acrylamide from said solvent.

References Cited

UNITED STATES PATENTS

| | | | |
|---|---|---|---|
| 3,324,180 | 6/1967 | Beer et al. | 260—561 |
| 3,301,900 | 1/1967 | Talet | 260—561 |
| 3,008,990 | 11/1961 | Weiss | 260—561 |
| 2,683,173 | 7/1954 | Weisgerber | 260—561 |

ALEX MAZEL, Primary Examiner

J. A. NARCAVAGE, Assistant Examiner